United States Patent
Yoon et al.

(10) Patent No.: US 10,868,445 B2
(45) Date of Patent: Dec. 15, 2020

(54) MAGNETIC SHEET AND WIRELESS POWER RECEPTION DEVICE COMPRISING SAME

(71) Applicant: LG INNOTEK CO., LTD., Seoul (KR)

(72) Inventors: Jong Heum Yoon, Seoul (KR); So Yeon Kim, Seoul (KR); Seok Bae, Seoul (KR); Sang Won Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/481,366

(22) PCT Filed: Feb. 8, 2018

(86) PCT No.: PCT/KR2018/001676
§ 371 (c)(1),
(2) Date: Jul. 26, 2019

(87) PCT Pub. No.: WO2018/147649
PCT Pub. Date: Aug. 16, 2018

(65) Prior Publication Data
US 2019/0393727 A1  Dec. 26, 2019

(30) Foreign Application Priority Data
Feb. 10, 2017 (KR) .................. 10-2017-0018702

(51) Int. Cl.
*H02J 50/12* (2016.01)
*H02J 7/02* (2016.01)
(Continued)

(52) U.S. Cl.
CPC ............. *H02J 50/12* (2016.02); *H01F 1/16* (2013.01); *H01F 38/14* (2013.01); *H02J 7/025* (2013.01)

(58) Field of Classification Search
CPC ... H02J 50/12; H02J 7/025; H02J 7/02; H01F 1/16; H01F 38/14
See application file for complete search history.

(56) References Cited

U.S. PATENT DOCUMENTS

2010/0099365 A1   4/2010   Aramaki et al.
2015/0123604 A1   5/2015   Lee et al.
(Continued)

FOREIGN PATENT DOCUMENTS

EP          2797092       10/2014
KR    10-2010-0011988      2/2010
(Continued)

OTHER PUBLICATIONS

International Search Report dated May 18, 2018 issued in Application No. PCT/KR2018/001676.

*Primary Examiner* — Robert L Deberadinis
(74) *Attorney, Agent, or Firm* — Ked & Associates, LLP

(57) ABSTRACT

A magnetic sheet according to an embodiment comprises: a first magnetic sheet part comprising a first surface; a second magnetic sheet part comprising a second surface facing the first surface; and an adhesion part disposed between the first surface and the second surface, wherein the adhesion part comprises a plurality of magnetic particles, and the plurality of magnetic particles may have a concentration gradient in the thickness direction of the adhesion part.

20 Claims, 16 Drawing Sheets

(51) Int. Cl.
*H01F 1/16* (2006.01)
*H01F 38/14* (2006.01)

(56) References Cited

U.S. PATENT DOCUMENTS

2016/0372975 A1 12/2016 Jang et al.
2017/0222472 A1 8/2017 Lee et al.

FOREIGN PATENT DOCUMENTS

| KR | 10-1481042 | 1/2015 |
| KR | 10-2016-0037652 | 4/2016 |
| KR | 10-2016-0149967 | 12/2016 |

FIG. 6d
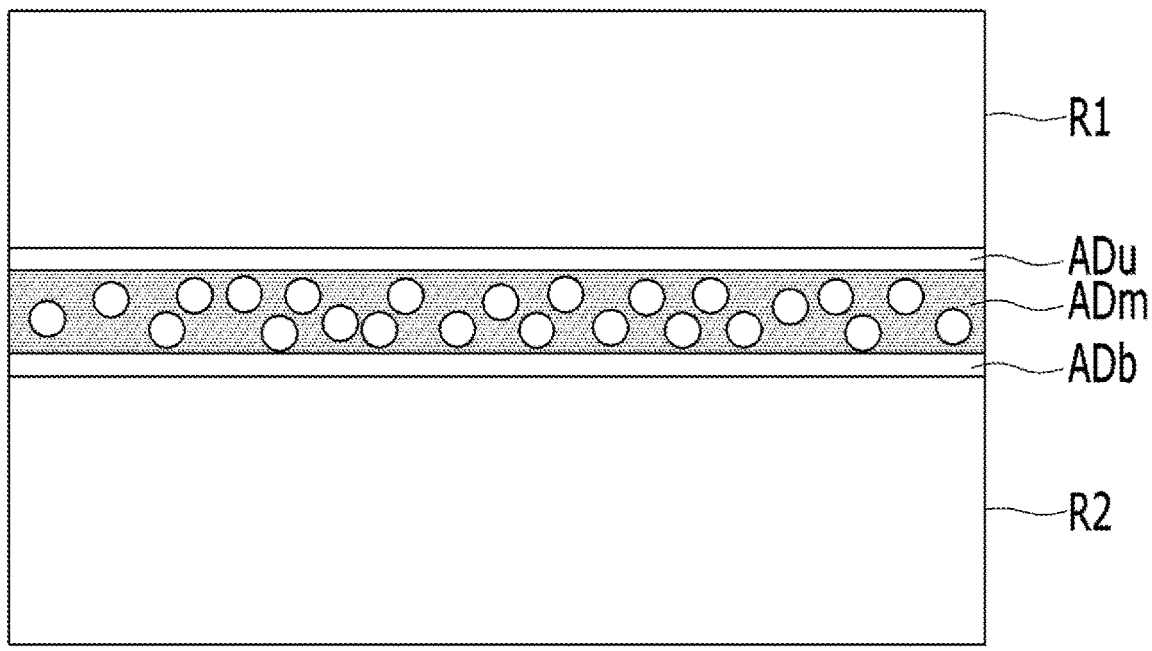
FIG. 7a
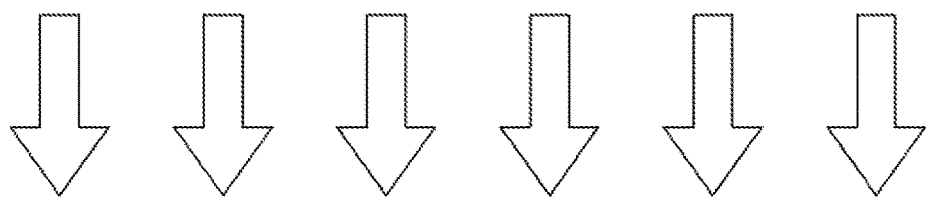
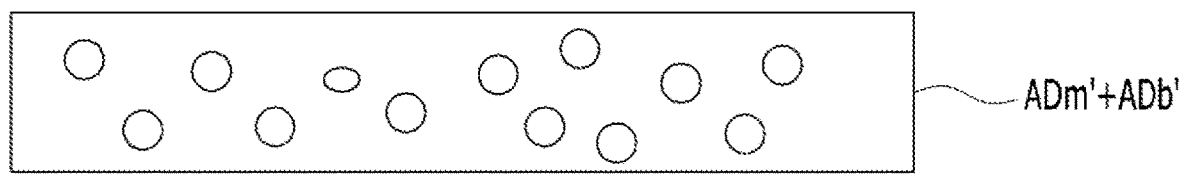

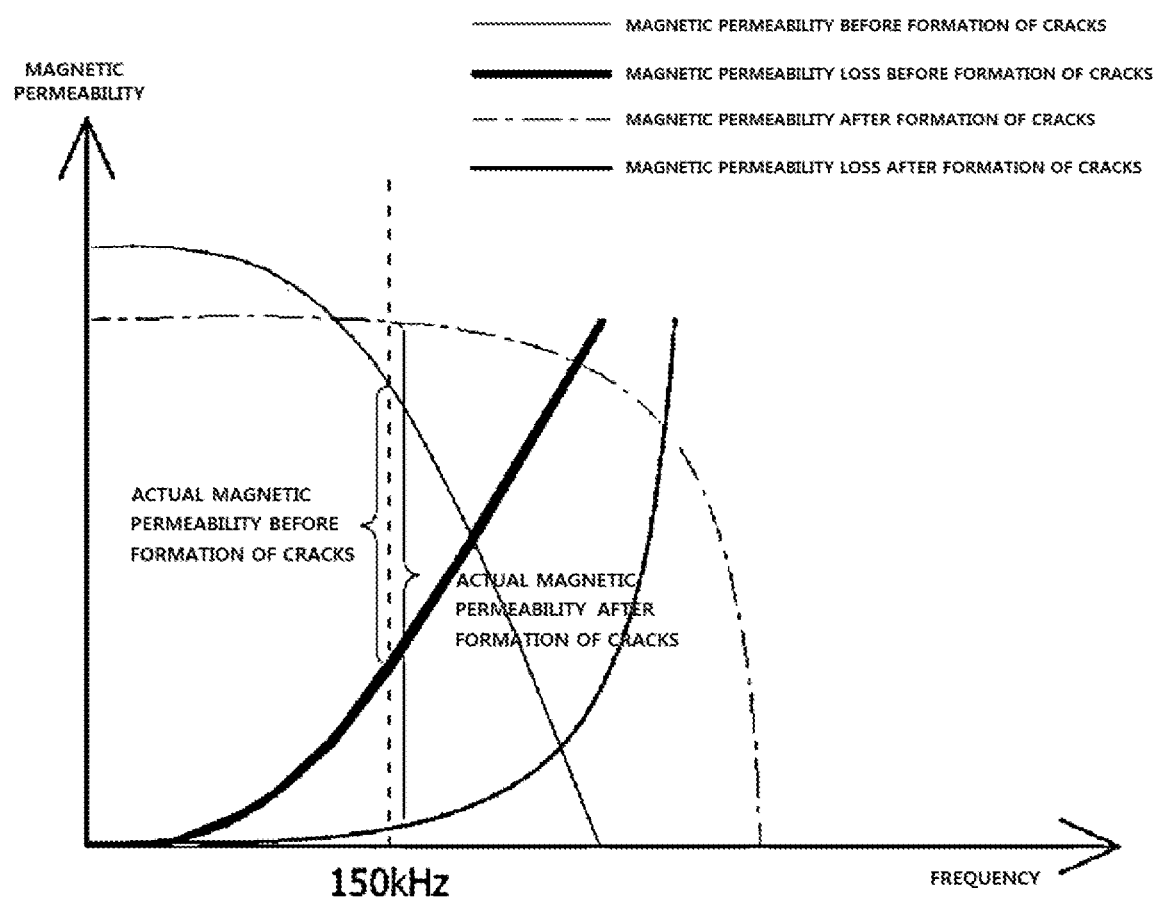

MAGNETIC SHEET AND WIRELESS POWER RECEPTION DEVICE COMPRISING SAME

CROSS-REFERENCE TO RELATED PATENT APPLICATIONS

This application is a U.S. National Stage Application under 35 U.S.C. § 371 of PCT Application No. PCT/KR2018/001676, filed Feb. 8, 2018, which claims priority to Korean Patent Application No. 10-2017-0018702, filed Feb. 10, 2017, whose entire disclosures are hereby incorporated by reference.

TECHNICAL FIELD

Embodiments relate to a magnetic sheet and a wireless power receiving device including the same.

BACKGROUND ART

As a Near Field Communication (NFC) function is applied to mobile terminals such as smartphones, it has come to be widely used for a payment means, a transportation card, an access card, or point-to-point (P2P) information exchange between mobile phones. Since NFC is a short-range communication technology that operates at 13.56 MHz and within a distance of up to 20 cm, it is safe from hacking, and thus is suitable as a payment means.

An NFC antenna (not shown) for implementing the NFC function, taking into account the size thereof, may be disposed on the rear surface of a battery included in a smartphone (not shown), or may be mounted on or molded in the rear surface of a smartphone case. In particular, because the case of a smartphone battery is made of metal, the electromagnetic energy generated from the NFC antenna is absorbed by the battery case, which acts as a parasitic coupler. Therefore, the communication sensitivity of the NFC antenna is lowered, and as a result, the communication distance becomes very short. Thus, electromagnetic isolation between the metallic battery case and the NFC antenna is required. A magnetic sheet, which is magnetically permeable and has a thickness of 1 mm or less, is mainly used as an isolation element.

Recently, wireless power transfer (i.e. wireless power transmission/reception) technology has attracted much attention. Representative examples of standard methods for wireless power transfer include wireless power consortium (WPC), alliance for wireless power (A4WP), and power matters alliance (PMA), and the wireless power transfer methods are classified into a magnetic induction method and a magnetic resonance method in terms of technology. A magnetic material for magnetic induction or magnetic resonance is used in transmitting/receiving modules of a wireless power transfer system. There has been an attempt to minimize electromagnetic energy loss by employing a magnetic sheet made of a magnetic material as an electromagnet-shielding material. As such, efforts have been continuously made to improve transfer efficiency (wireless power transfer) and performance, and to date have relied solely on the design of coils.

Representative examples of the magnetic sheet may include a sheet including a ferrite material, a composite-type sheet including a metal powder and a polymer resin, and a metallic ribbon sheet implemented as a metallic-alloy-based magnetic ribbon sheet or a single metallic ribbon. Among these, in the case of a sheet including a ferrite material, magnetic permeability is good; however, there is a limitation related to thickness due to limitations related to high-temperature calcination and magnetic flux density. In the case of a composite-type sheet, magnetic permeability is low. On the other hand, a metallic ribbon sheet exhibits high magnetic permeability and magnetic flux density despite the small thickness thereof.

"Metallic ribbon" refers to an amorphous or nanocrystalline metal or alloy that is manufactured in the form of a very thin foil through an atomizer method or the like. In general, however, such a metallic ribbon is used in a multilayer stacked structure in order to obtain desired shielding properties. During near field communication or wireless power transfer, energy is transferred in the form of a magnetic field having a particular frequency. Thus, in the case in which a magnetic sheet is formed in a unitary body, rather than being formed by stacking metallic ribbons, conductivity increases, and as a result, eddy current loss increases exponentially.

In order to realize a stacked structure, metallic ribbons and adhesive films having an insulation function may be alternately disposed in layers. However, in the case in which the adhesive film is disposed between every two metallic ribbons, the total effective magnetic permeability is lowered due to magnetic flux loss that is generated in the adhesive film, which causes deterioration in transfer efficiency. In addition, in the case in which the number of stacked layers is increased in order to compensate for the effective magnetic permeability, the thickness of the magnetic sheet is increased, and thus the freedom in designing a product having a near field communication or wireless power transfer function is reduced.

DISCLOSURE

Technical Problem

Embodiments provide a magnetic sheet including a bonding part capable of exhibiting high transfer efficiency while securing bonding force and a wireless power receiving device including the same.

Technical Solution

In one embodiment, a magnetic sheet may include a first magnetic sheet part including a first surface, a second magnetic sheet part including a second surface that faces the first surface, and a bonding part disposed between the first surface and the second surface, wherein the bonding part may include a plurality of magnetic particles, and the magnetic particles may have a concentration gradient in a thickness direction of the bonding part.

For example, the concentration of the magnetic particles may gradually increase toward the center in the thickness direction of the bonding part.

For example, the concentration of the magnetic particles may be asymmetrical with respect to the center in the thickness direction of the bonding part.

For example, the magnetic particles may be contained in an amount of 50 to 90% by weight in the bonding part.

For example, the bonding part may include a first layer, a second layer disposed under the first layer, and a third layer disposed under the second layer, and the magnetic particles may be contained in the second layer.

For example, the first layer and the third layer may include a first adhesive, the second layer may include a second adhesive, and the magnetic particles may be dispersed in the second adhesive.

For example, the first adhesive and the second adhesive may include different components from each other.

For example, the first adhesive may include at least one of ethyl vinyl acetate, polyamide, polyolefin, or reactive urethane, and the second adhesive may include at least one of an acrylic resin, a urethane resin, an epoxy resin, a silicon resin, a phenol resin, an amino resin, an unsaturated polyester resin, a polyurethane resin, a urea resin, a melamine resin, a polyimide resin, a diallyl phthalate resin, or a modified resin thereof.

For example, at least one of the first magnetic sheet part or the second magnetic sheet part may include a plurality of patterns, each of which includes three or more lines extending radially from a predetermined point.

In another embodiment, a magnetic sheet may include at least three magnetic sheet parts stacked on one another, and bonding parts, one of which is disposed between two opposing surfaces of every two adjacent ones of the stacked magnetic sheet parts, wherein the bonding parts may include a plurality of magnetic particles, and the magnetic particles may have a concentration gradient in a thickness direction of the bonding parts.

In still another embodiment, a wireless power receiving device configured to receive power transferred from a wireless power transmitting device may include a substrate, a magnetic sheet disposed on the substrate, and a coil disposed on the magnetic sheet and configured to receive electromagnetic energy emitted from the wireless power transmitting device, wherein the magnetic sheet may include a first magnetic sheet part including a first surface, a second magnetic sheet part including a second surface that faces the first surface, and a bonding part disposed between the first surface and the second surface, the bonding part may include a plurality of magnetic particles, and the magnetic particles may have a concentration gradient in a thickness direction of the bonding part.

For example, the wireless power receiving device may be included in a mobile terminal.

Advantageous Effects

According to a magnetic sheet and a wireless power receiving device including the same according to embodiments, a bonding part, in which magnetic particles have a concentration gradient in a thickness direction of the bonding part, is provided, thereby securing a sufficient bonding area while maintaining a high magnetic particle content, and consequently accomplishing high transfer efficiency.

DESCRIPTION OF DRAWINGS

FIG. 10 is a graph comparing actual magnetic permeability for each frequency before and after cracks are formed in a metallic ribbon.

BEST MODE

Figure 1:
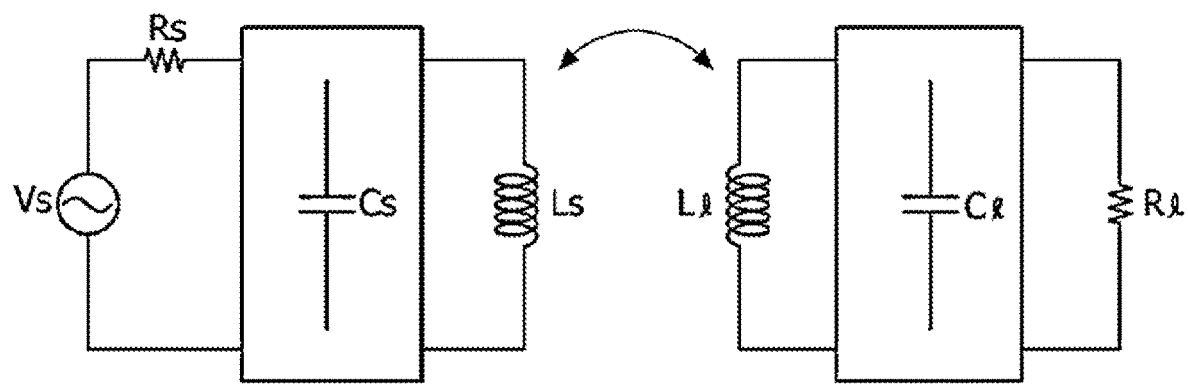
FIG. 1 is an equivalent circuit of a general magnetic induction method.

The present disclosure will now be described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a magnetic sheet 210 and a wireless power receiving device 200 including the same according to an embodiment will be described with reference to the accompanying drawings. The magnetic sheet 210 and the wireless power receiving device 200 including the same will be described using the Cartesian coordinate system (x-axis, y-axis, z-axis) for convenience of description. However, other different coordinate systems may be used. In the drawings, an x-axis, a y-axis, and a z-axis of the Cartesian coordinate system are perpendicular to each other. However, the embodiment is not limited thereto. That is, the x-axis, the y-axis, and the z-axis may intersect each other, rather than being perpendicular to each other.

Terms and abbreviations used in the embodiment may be defined as follows.

Wireless Power Transfer System: a system collectively referring to a wireless power transfer system-charger and a wireless power transfer system-device.

Wireless Power Transfer System-Charger or Transmitting Unit: a system transferring wireless power to one or more power receivers within a magnetic field range.

Wireless Power Transfer System-Device or Receiving Unit: a system receiving wireless power transferred from a wireless power transfer system-charger within a magnetic field region.

Charging Area: an area in which actual wireless power transfer is made within a magnetic field region, and which may vary depending on the size, power required by, and operating frequency of an applied product.

Scattering parameter (S parameter): the ratio of an input voltage to an output voltage in a frequency distribution, the ratio of an input port to an output port, or a self-reflection value of each input/output port, i.e. the value of an output reflected back via self-input.

Quality Factor (Q): the value of Q in a resonant state designates the quality of frequency selection. The higher the value of Q, the better the resonance characteristics. The value of Q is expressed as the ratio of energy stored to energy lost in a resonator.

The wireless power transfer system-charger, which transfers power to the wireless power transfer system-device, according to the embodiment may use various types of frequency bands ranging from a low frequency (50 kHz) to a high frequency (15 MHz) in order to transfer power. Further, the wireless power transfer system-charger requires the support of a communication system that is capable of exchanging data and control signals in order to control the wireless power transfer system.

The wireless power transfer system-device according to the embodiment may be applied to various industrial fields, such as a mobile terminal industry, a smart watch industry, a PC and laptop computer industry, a household appliance industry, an electric vehicle industry, a medical device industry, and a robot industry, which use an electronic device that uses or requires a battery.

The embodiment may take into consideration a wireless power transfer system capable of transferring power to at least one device using one or multiple transmission coils provided in the device.

According to the embodiment, it is possible to overcome a battery shortage problem in mobile devices such as smartphones, laptops, etc. For example, when using a smartphone or a laptop while placing the same on a wireless charging pad disposed on a table, the battery will be charged automatically, thus making it possible to use the smartphone or the laptop for a long period of time. In addition, if wireless charging pads are installed in public places such as coffee shops, airports, taxis, offices and restaurants, it is possible to charge various types of mobile devices irrespective of the type of charging terminal, which differs among individual mobile device manufacturers. Furthermore, if wireless power transfer technology is applied to household electrical appliances such as vacuum cleaners and electric fans, there is no need to look for power cables, and complex wiring may be eliminated in the home, which leads to reduced wiring in buildings and improved space utilization. Moreover, it takes a lot of time to charge an electric car with a typical household power source. However, when high power is transferred through wireless power transfer technology, it is possible to reduce the charging time. If wireless charging equipment is installed on the floor of a parking lot, it is possible to eliminate inconvenience related to providing a power cable near an electric vehicle.

A magnetic sheet according to the embodiment may be applied to the various fields set forth above. Hereinafter, for better understanding of the magnetic sheet according to the embodiment, the wireless power transfer system-device according to the embodiment, which includes a magnetic sheet, will be described with reference to FIGS. 1 to 3.

FIG. 1 illustrates an equivalent circuit of a general magnetic induction method.

Regarding the principle of transferring power wirelessly, a magnetic induction method is one example of such a wireless power transfer method. The magnetic induction method is a non-contact energy transfer technology in which an electromotive force is generated in a load inductor LI via magnetic flux that is generated when a source inductor Ls and the load inductor LI are brought close to each other and current is supplied to the source inductor Ls.

Referring to FIG. 1, in the equivalent circuit of the magnetic induction method, the transmitting unit may be implemented to have a source voltage Vs depending on the apparatus supplying power thereto, a source resistance Rs, a source capacitor Cs for impedance matching, and a source coil Ls for magnetic coupling with a receiving unit, and the receiving unit may be implemented to have a load resistance RI, which is an equivalent resistance of the receiving unit, a load capacitor CI for impedance matching, and a load coil LI for magnetic coupling with the transmitting unit. The degree of magnetic coupling between the source coil Ls and the load coil LI may be denoted by mutual inductance MsI.

When the ratio of an input voltage to an output voltage is calculated from the magnetic induction equivalent circuit, which includes only coils without the source capacitor Cs and the load capacitor CI for impedance matching shown in FIG. 1, and when a maximum power transfer condition is established based on the calculated ratio, the maximum power transfer condition satisfies Equation 1 below.

$$Ls/Rs = LI/RI \qquad \text{[Equation 1]}$$

According to the above Equation 1, when the ratio of inductance of the transmission coil Ls to the source resistance Rs is the same as the ratio of inductance of the load coil LI to the load resistance RI, maximum power transfer becomes possible. Because there is no capacitor to compensate for reactance in a wireless power transfer system in which only inductance is present, a self-reflection value of the input/output port at the point at which the maximum power transfer is performed may not be 0, and power transfer efficiency may vary greatly depending on the value of the mutual inductance MsI. Accordingly, the source capacitor Cs may be added to the transmitting unit and the load capacitor CI may be added to the receiving unit as compensation capacitors for impedance matching. The compensation capacitors Cs and CI may be respectively connected, for example, to the receiving coil Ls and the load coil Li in a serial or parallel connection manner. In addition, passive elements such as additional capacitors and inductors as well as the compensation capacitors may be added to each of the transmitting unit and the receiving unit in order to realize impedance matching.

Based on the above wireless power transfer principle, a wireless power transfer system for transferring power through a magnetic induction method or a magnetic resonance method will be described below.

Figure 2:
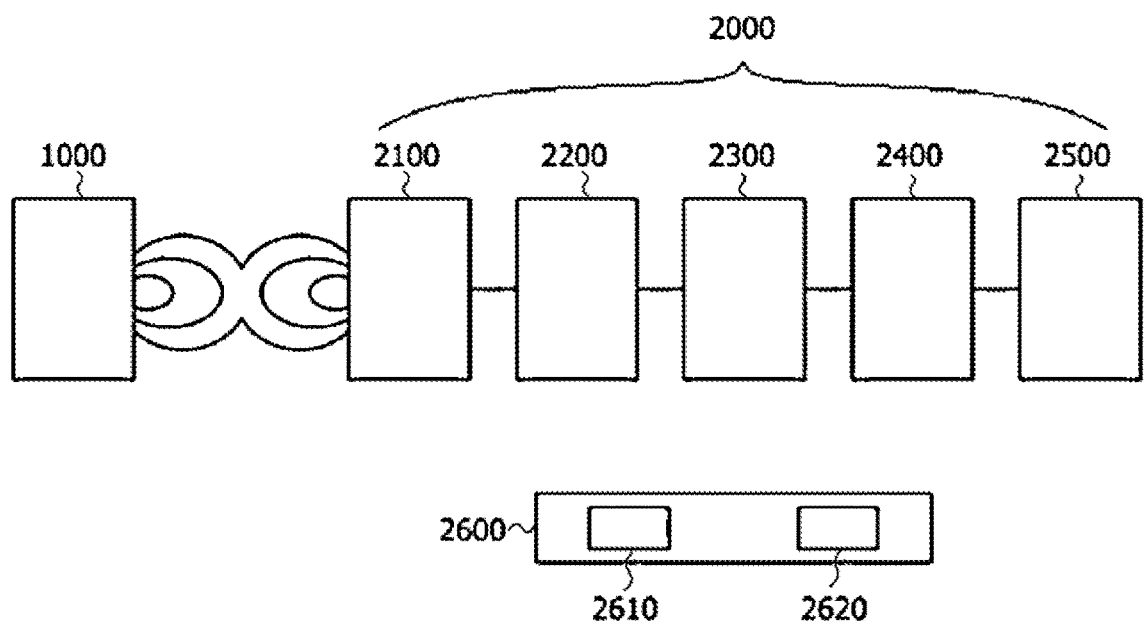
FIG. 2 is a block diagram showing a wireless power receiving device, which is one of subsystems constituting a wireless power transfer system.

FIG. 2 is a block diagram of a general wireless power transfer system.

Referring to FIG. 2, the wireless power transfer system may include a transmitting unit 1000 and a receiving unit 2000, which wirelessly receives power from the transmitting unit 1000. The receiving unit 2000, which is one of the subsystems constituting the wireless power transfer system, may include a receiving-side coil unit 2100, a receiving-side matching unit 2200, a receiving-side AC/DC conversion unit 2300, a receiving-side DC/DC conversion unit 2400, a load unit 2500, and a receiving-side communication and control unit 2600. In the present disclosure, the term "receiving unit 2000" may be used interchangeably with the term "wireless power transfer system-device".

The receiving-side coil unit 2100 may receive power through the magnetic induction method, and may include one or more induction coils. In addition, the receiving-side coil unit 2100 may further include an antenna for near field communication. Further, the receiving-side coil unit 2100 may be the same as a transmitting-side coil unit (not shown), and the dimensions of a receiving antenna may vary depending on the electrical characteristics of the receiving unit 2000.

The receiving-side matching unit 2200 may perform impedance matching between the transmitting unit 1000 and the receiving unit 2000.

The receiving-side AC/DC conversion unit 2300 generates a DC signal by rectifying an AC signal output from the receiving-side coil unit 2100.

The receiving-side DC/DC conversion unit 2400 may control the level of a DC signal output from the receiving-side AC/DC conversion unit 2300 in accordance with the capacity of the load unit 2500.

The load unit 2500 may include a battery, a display, an audio output circuit, a main processor, and various sensors.

The receiving-side communication and control unit 2600 may be activated by wake-up power from a transmitting-side communication and control unit (not shown), may perform communication with the transmitting-side communication and control unit, and may control the operation of the subsystem of the receiving unit 2000.

The receiving unit 2000 may be embodied as a single receiving unit or a plurality of receiving units, and may wirelessly receive energy from the transmitting unit 1000. That is, in terms of the magnetic induction method, a plurality of target receiving units 2000 may receive power from a single transmitting unit 1000 as a result of including a plurality of receiving-side coil units 2100, which are independent of each other. In this case, a transmitting-side matching unit (not shown) of the transmitting unit 1000 may adaptively perform impedance matching between the receiving units 2000.

Further, in the case in which the receiving unit 2000 is provided in a plural number, the receiving units may have the same type of system or different types of system.

Meanwhile, describing the relationship between the intensity and the frequency of a signal of the wireless power transfer system, in the case of a magnetic-induction-type wireless power transfer, in the transmitting unit 1000, a transmitting-side AC/DC conversion unit (not shown) may receive an AC signal of 60 Hz having 100 V to 230 V, may convert the AC signal to a DC signal having 10 V to 20 V, and may output the DC signal, and a transmitting-side DC/AC conversion unit may receive the DC signal and may output an AC signal of 125 kHz. In addition, in the receiving unit 2000, the receiving-side AC/DC conversion unit 2300 may receive the AC signal of 125 kHz, may convert the AC signal into a DC signal having 10 V to 20 V, and may output the DC signal, and the receiving-side DC/DC conversion unit 2400 may output a DC signal suitable for the load unit 2500, e.g. a DC signal having 5 V, and may transfer the DC signal to the load unit 2500.

Hereinafter, a wireless power receiving device 200 according to the embodiment, which performs at least some of the functions of the wireless power transfer system-device 2000 shown in FIG. 2, will be described.

Figure 3:
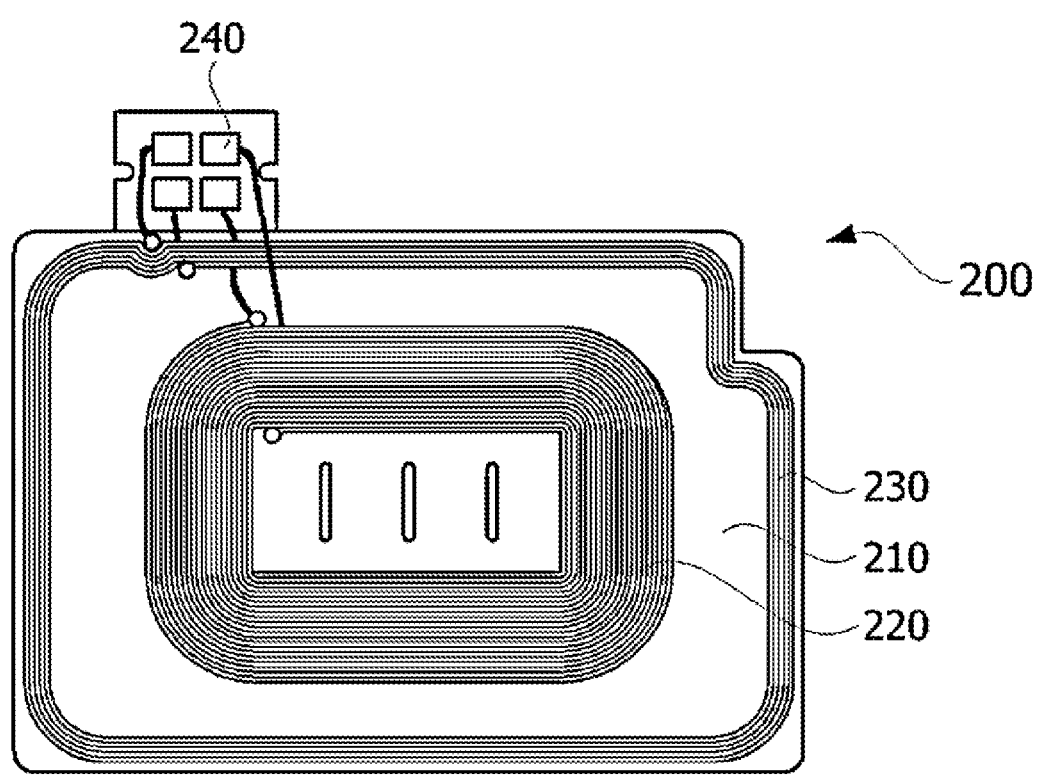
FIG. 3 is a plan view showing a part of the wireless power receiving device according to an embodiment.

FIG. 3 is a plan view showing a part of the wireless power receiving device 200 according to the embodiment.

The wireless power receiving device 200 includes a receiving circuit (not shown), a magnetic sheet 210, and a receiving coil 220. The magnetic sheet 210 may be disposed on a substrate (not shown), or a plurality of magnetic sheets 210 may be stacked on the substrate. The substrate may be made of multiple layers of fixed sheets, and may be bonded to the magnetic sheet 210 so as to fix the magnetic sheet 210.

The magnetic sheet 210 focuses electromagnetic energy that is radiated from a transmitting coil (not shown) of the wireless power transmitting device 1000.

The receiving coil 220 is stacked on the magnetic sheet 210. The receiving coil 220 may be disposed on the magnetic sheet 210 so as to be wound in a direction parallel to the magnetic sheet 210. For example, in the case of a receiving antenna that is applied to mobile terminals such as smartphones, the receiving coil may be in the form of a spiral coil having an outer diameter of 50 mm or less and an inner diameter of 20 mm or more. The receiving circuit converts the electromagnetic energy received through the receiving coil 220 into electrical energy, and charges a battery (not shown) with the converted electrical energy.

Although not shown, a heat dissipation layer may be further included between the magnetic sheet 210 and the receiving coil 220.

Meanwhile, in the case in which the wireless power receiving device 200 has a WPC function, a near field communication (NFC) function, and a mobile payment function at the same time, an NFC coil 230 and a coil (not shown) for mobile payment may be further stacked on the magnetic sheet 210. The NFC coil 230 and the mobile payment coil may each have a planar shape surrounding the receiving coil 220.

Further, each of the receiving coil 220 and the NFC coil 230 may be electrically connected to an external circuit (e.g. an integrated circuit) (not shown) via terminals 240.

Although it is illustrated in FIG. 3 that both the receiving coil 220 and the NFC coil 230 are disposed on a single magnetic sheet 210, this is merely illustrative. In another embodiment, each of the individual magnetic sheets may be disposed in a corresponding one of the regions of the coils 220 and 230. In this case, the magnetic sheets corresponding to the respective coils may be configured to have different shielding properties from each other, or may be configured to have the same properties as each other. In addition, although it is illustrated in FIG. 3 that the NFC coil 230 surrounds the periphery of the receiving coil 220, this is merely illustrative. The two coils 220 and 230 may be formed in separate regions so as to be spaced apart from each other such that neither of the two coils 220 and 230 surrounds the other one.

Embodiments of the present disclosure provide a magnetic sheet including a bonding part in which magnetic particles have a concentration gradient in a thickness direction thereof, and a wireless power receiving device using the same.

Hereinafter, the structure of the magnetic sheet and the process of manufacturing the same according to the embodiment will be described with reference to FIGS. 4a to 7c.

Figure 4A:
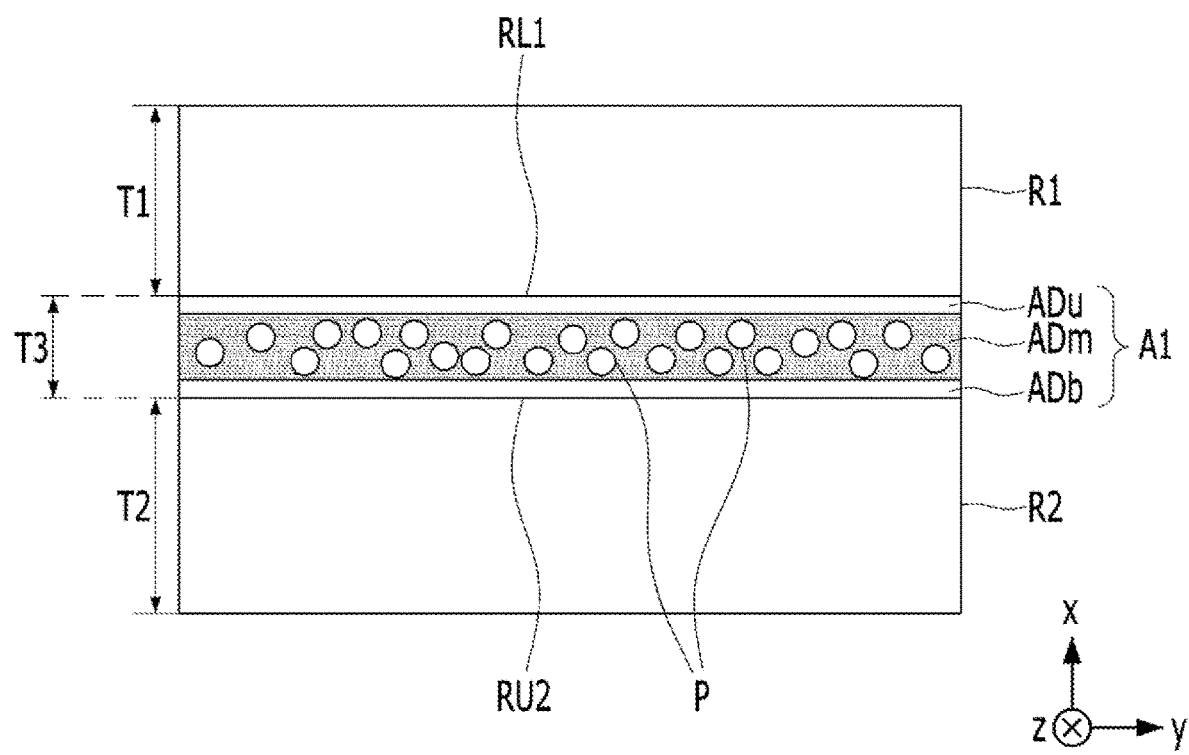
FIG. 4a illustrates a cross-sectional view of a magnetic sheet according to an embodiment.
Figure 4B:
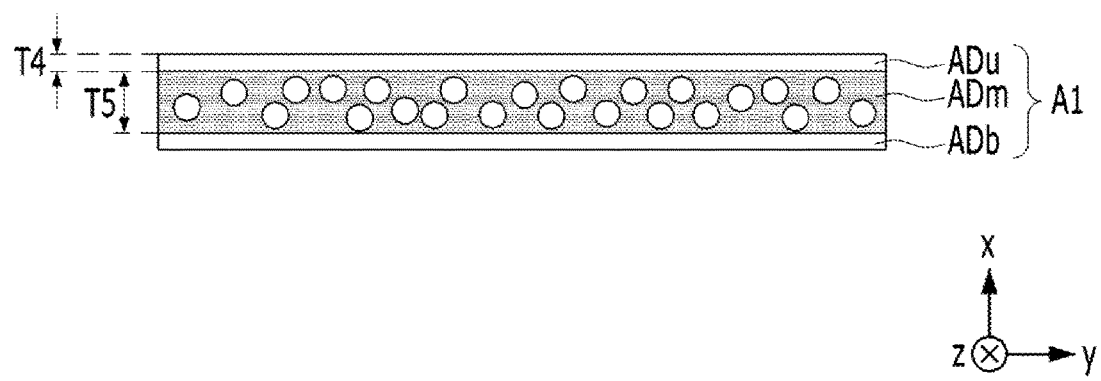
FIGS. 4b and 4c illustrate cross-sectional views of a bonding part according to an embodiment.
Figure 4C:
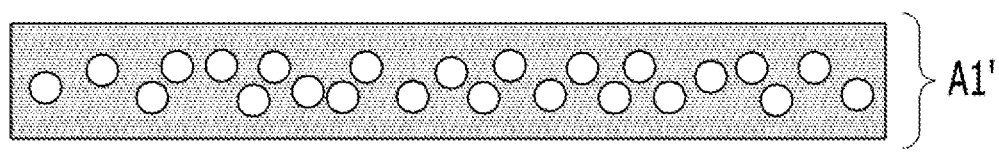

FIG. 4a illustrates a cross-sectional view of a magnetic sheet according to an embodiment, and FIGS. 4b and 4c illustrate cross-sectional views of a bonding part according to an embodiment.

Referring to FIG. 4a, a magnetic sheet 210A according to the embodiment may include a first magnetic sheet part R1, a second magnetic sheet part R2, and a bonding part A1. The first magnetic sheet part R1, the second magnetic sheet part R2, and the bonding part A1 may be stacked so as to at least partially overlap each other in the x-axis direction. In greater detail, the bonding part A1 may be disposed between the lower surface RL1 of the first magnetic sheet part R1 and the upper surface RU2 of the second magnetic sheet part R2, which are opposite each other.

At least one of the first magnetic sheet part R1 or the second magnetic sheet part R2 may be formed of a metallic-alloy-based magnetic ribbon. In the present disclosure, metallic alloys having the shape of a very thin "band", "string", or "belt" in a crystalline or amorphous state are collectively referred to as a "ribbon". In addition, the "ribbon" defined in the present disclosure is a metallic alloy in principle, but the term "ribbon" may be separately used due to the external appearance thereof. Fe—Si—B may be used as a main material of the ribbon, and the ribbon may be manufactured in various compositions by adding at least one additive of Nb, Cu, or Ni. Of course, the ribbon is just one exemplary material of the magnetic sheet part. In another embodiment, the magnetic sheet part may be made of a ribbon including metallic-alloy-based magnetic powders including one element or a combination of two or more elements selected from the group consisting of Fe, Ni, Co, Mo, Si, Al, and B, or may be made of a composite material of the ribbon and polymer.

The thickness T1 of the first magnetic sheet part R1 and the thickness T2 of the second magnetic sheet part R2 may be the same or different in the x-axis direction. Further, the thicknesses T1 and T2 of the magnetic sheet parts R1 and R2 in the x-axis direction may be uniform or non-uniform in the y-axis and z-axis directions.

For example, each of the thicknesses T1 and T2 of the magnetic sheet parts R1 and R2 in the x-axis direction may range from 10 μm to 200 μm.

Magnetic particles P may be dispersed in the bonding part A1, and may have a concentration gradient in the thickness direction of the bonding part A1. For example, the concentration of the magnetic particles P may gradually increase toward the center in the thickness direction of the bonding part A1. Here, the concentration of the magnetic particles P may be symmetrical or asymmetrical with respect to the center in the thickness direction of the bonding part A1.

A configuration in which the magnetic particles P have a concentration gradient in the bonding part A1 in the thickness direction may be realized such that the bonding part A1 includes a plurality of adhesive layers and some of the adhesive layers include most of the magnetic particles P.

According to one embodiment, the bonding part A1 may include an upper adhesive layer ADu, an intermediate adhesive layer ADm, and a lower adhesive layer ADb. The first magnetic sheet part R1 may be disposed on the upper adhesive layer ADu, and the second magnetic sheet part R2 may be disposed under the lower adhesive layer ADb in the X-axis direction, which is the thickness direction. A plurality of magnetic particles P may be dispersed in the intermediate adhesive layer ADm. Thus, when viewing the bonding part A1 as a whole, the magnetic particles P may have a concentration gradient in the thickness direction, and the concentration of the magnetic particles P gradually may increase toward the center in the thickness direction.

Depending on the embodiment, the magnetic particles P may be dispersed over the intermediate adhesive layer ADm and at least one of the upper adhesive layer ADu or the lower adhesive layer ADb. For example, a part of one magnetic particle P is contained in the intermediate adhesive layer ADm, and the remaining part thereof is contained in the upper adhesive layer ADu or the lower adhesive layer ADb. In this manner, the magnetic particles P may be dispersed in the bonding part A1 so as to be disposed over two layers.

The thickness T3 of the bonding part A1 may range from 3 μm to 1 cm in the direction from the lower surface RL1 of the first magnetic sheet part R1 to the upper surface RU2 of the second magnetic sheet part R2, which is opposite the lower surface RL1 of the first magnetic sheet part R1 (i.e. in the x-axis direction). For example, the thickness T3 of the bonding part A1 may preferably range from 3 μm to 40 μm, more preferably from 3 μm to 5 μm or from 10 μm to 40 μm.

The thickness of each of the layers constituting the bonding part A1 will be described with reference to FIG. 4b. Referring to FIG. 4b, the thickness T4 of each of the upper adhesive layer Adu and the lower adhesive layer ADb may be 10 μm or less. For example, the thickness T4 of each of the upper adhesive layer Adu and the lower adhesive layer ADb may be 3 μm or less, preferably 1 μm or less, and more preferably 0.5 μm or less.

Further, the thickness T5 of the intermediate adhesive layer ADm, in which the magnetic particles P are dispersed, may be 20 μm or less, e.g. from 1 μm to 3 μm, or from 4 μm to 20 μm.

Of course, the above-mentioned thickness ranges are merely illustrative, and the embodiment is not limited thereto. Each of the thicknesses T4 and T5 of the adhesive layers may be uniform or non-uniform in the y-axis and z-axis directions.

Meanwhile, each of the adhesive layers includes an organic material. Examples of the organic material as an adhesive component include an acrylic resin, a urethane resin, an epoxy resin, a silicon resin, a phenol resin, an amino resin, an unsaturated polyester resin, a polyurethane resin, a urea resin, a melamine resin, a polyimide resin, a diallyl phthalate resin, and a modified resin thereof. Here, the component of the intermediate adhesive layer ADm containing the magnetic particles P may be the same as or different from the component of the upper adhesive layer Adu and the component of the lower adhesive layer ADb. For example, the component of the intermediate adhesive layer ADm may be at least one of the components described above, and the component of the upper adhesive layer Adu and the component of the lower adhesive layer ADb may be ethyl vinyl acetate, polyamide, polyolefin, or reactive urethane, which is used in the hot-melt method.

In the case in which the component of the intermediate adhesive layer ADm is the same as the component of the upper adhesive layer Adu and the component of the lower adhesive layer ADb, as shown in FIG. 4c, a bonding layer A1' is formed such that the concentration of magnetic particles contained therein gradually increases toward the center in the thickness direction thereof and such that there is substantially no distinction between adhesive layers.

The magnetic particles P may be made of a non-conductive or poorly conductive material in order to reduce eddy current loss. In one example, the magnetic particles P may be ferrite. However, this is merely illustrative. In another example, the magnetic particles P may include at least one selected from the group consisting of magnetic stainless steel (Fe—Cr—Al—Si), sendust (Fe—Si—Al), Permalloy (Fe—Ni), a Fe—Si alloy, silicon copper (Fe—Cu—Si), Fe—S—B(Cu—Nb) alloy, a Fe—Si—Cr—Ni alloy, a Fe—Si—Cr alloy, and a Fe—Si—Al—Ni—Cr alloy.

The magnetic particles P may have a size of 5 μm or less. For example, considering the short distribution intervals between the particles, which helps maintain the bonding force, the size of the magnetic particles P may be 1 μm or less. Here, on the assumption that the magnetic particles have a spherical shape, the size of the magnetic particles P corresponds to the diameter of the sphere, but this is merely illustrative. The magnetic particles may have a prismatic or plate shape.

The magnetic particles may be contained in an amount of 50 wt % or more, but preferably 90 wt % or less, based on the total weight of the bonding part A1. Based on the total weight of the bonding part, when the amount of the magnetic particles is 50 wt % or more, the magnetic properties are greatly improved, but when the amount of the magnetic particles exceeds 90 wt %, the concentration of the magnetic particles is too high to obtain sufficient bonding force.

FIG. 4a exemplarily shows a minimum number of constituent elements of the magnetic sheet 210A according to the embodiment. However, the magnetic sheet according to the embodiment may include a larger number of magnetic sheet parts than those shown in FIG. 4a, and bonding parts, one of which is disposed between every two adjacent ones of the magnetic sheet parts. This will be described below with reference to FIG. 5.

Figure 5:
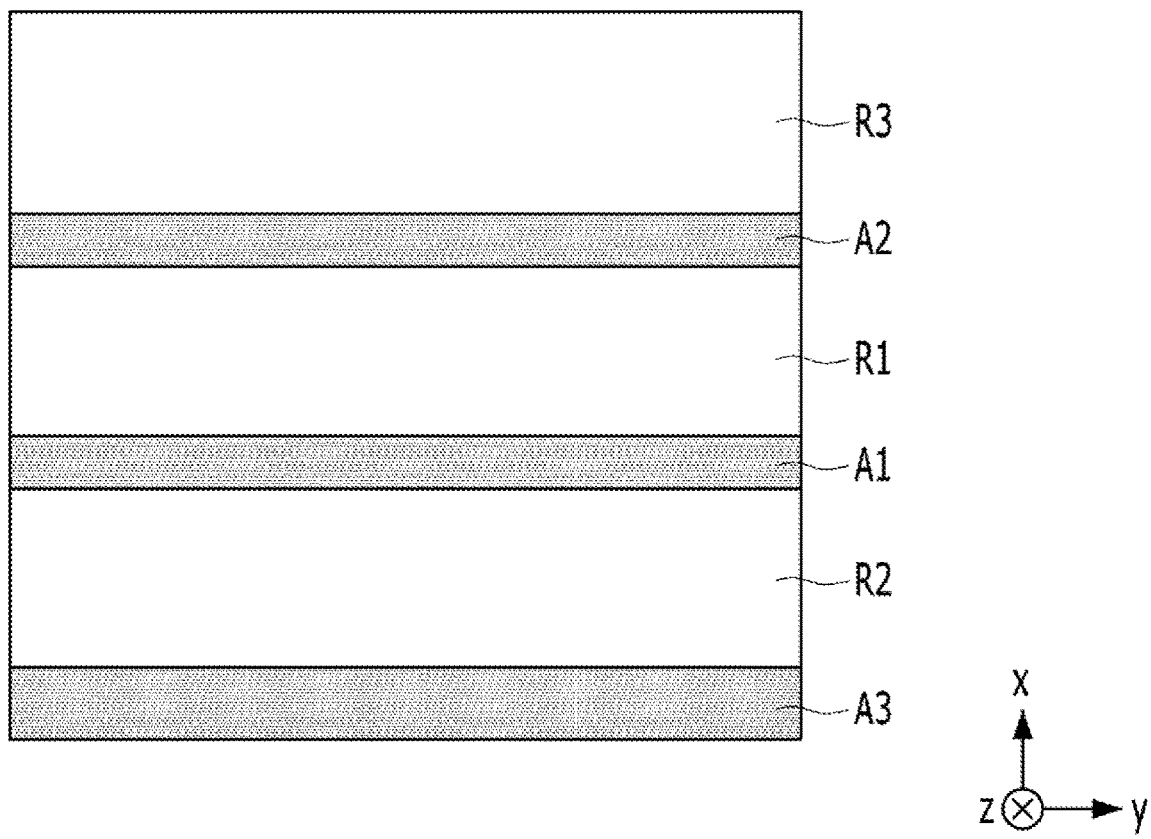
FIG. 5 illustrates a cross-sectional view of another example of the magnetic sheet according to the embodiment.

FIG. 5 is a cross-sectional view of another example of the magnetic sheet according to the embodiment.

As shown in FIG. 5, a magnetic sheet 210B may be configured such that a third magnetic sheet part R3 is disposed on a first magnetic sheet part R1 and a bonding part A2 is disposed between two surfaces of the first magnetic sheet part R1 and the third magnetic sheet part R3, which face each other. In addition, a bonding part A3 may be further provided under a second magnetic sheet part R2. If the second magnetic sheet part R2 is disposed at the lowermost layer among the magnetic sheet parts included in the magnetic sheet 210B, the bonding part A3 disposed under the second magnetic sheet part R2 may have a larger thickness than the remaining bonding parts A1 and A2 in the x-axis direction, and no magnetic particles may be included in the bonding part A3. A substrate (not shown) of the wireless power receiving device may be disposed below the bonding part A3 disposed under the second magnetic sheet part R2.

Hereinafter, a method of manufacturing the magnetic sheet 210A shown in FIG. 4a will be described with reference to the accompanying drawings. Of course, the magnetic sheet 210B shown in FIG. 5 may also be manufactured on the basis of the following description.

Figure 6A:
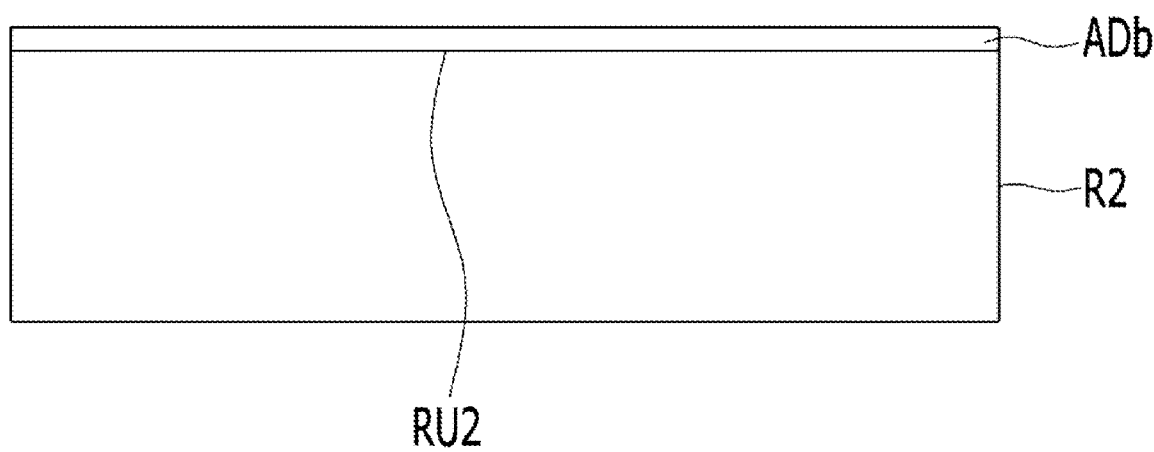
FIGS. 6a to 7c are process cross-sectional views showing a method of manufacturing the magnetic sheet 210A shown in FIG. 4a according to an embodiment.
Figure 6B:
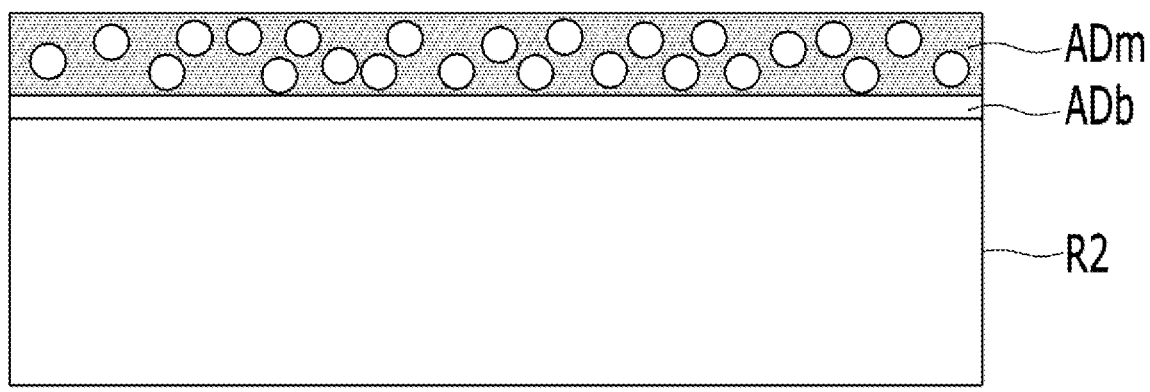
Figure 6C:
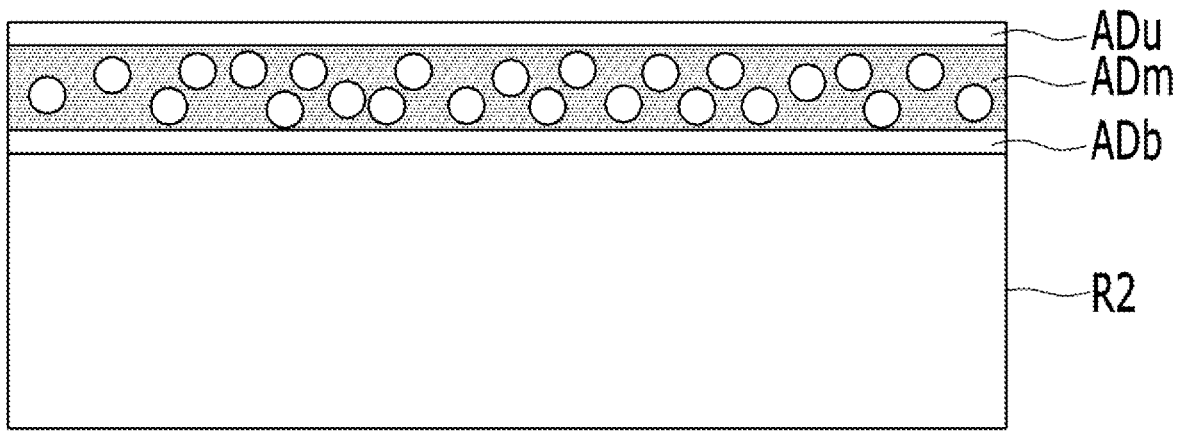
Figure 7B:
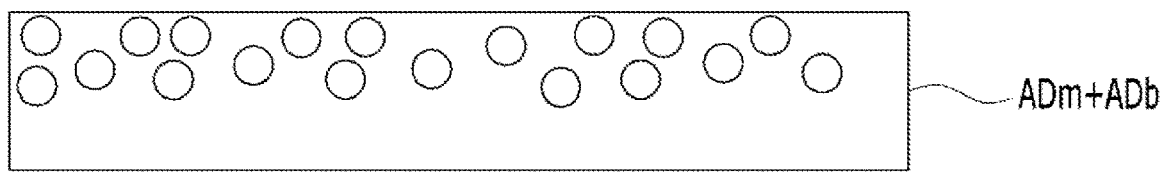
Figure 7C:
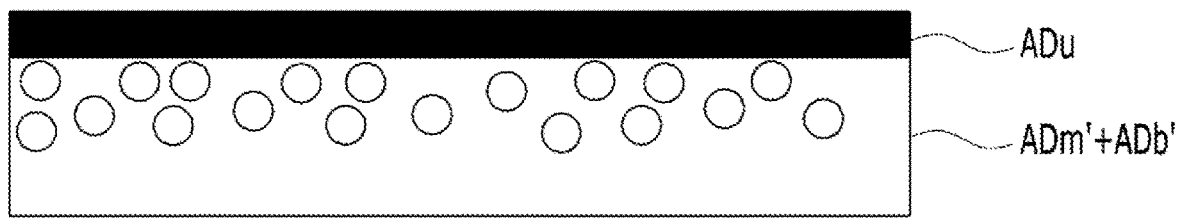

FIGS. 6a to 6d are process cross-sectional views showing a method of manufacturing the magnetic sheet 210A shown in FIG. 4a in a stacking manner according to the embodiment, and FIGS. 7a to 7c are process cross-sectional views showing a method of manufacturing the magnetic sheet 210A shown in FIG. 4a using a magnetic field according to the embodiment.

Referring to FIG. 6a, the lower adhesive layer ADb is disposed on the upper surface RU2 of the second magnetic sheet part R2. The lower adhesive layer ADb may be applied to the upper surface RU2 of the second magnetic sheet part R2 in a spraying or coating manner.

Subsequently, as shown in FIG. 6b, the intermediate adhesive layer ADm, in which the magnetic particles P are dispersed, may be disposed on the lower adhesive layer ADb.

Subsequently, as shown in FIG. 6c, the upper adhesive layer ADu may be disposed on the intermediate adhesive layer ADm. The upper adhesive layer ADu may also be applied on the intermediate adhesive layer ADm in a spraying or coating manner.

Thereafter, as shown in FIG. 6d, the first magnetic sheet part R1 may be stacked on the upper adhesive layer ADu.

Depending on the number of magnetic sheet parts that are stacked, the above respective processes may be repeatedly performed. For example, after the process shown in FIG. 6d, a lower adhesive layer ADb, an intermediate adhesive layer ADm, in which magnetic particles P are dispersed, and an upper adhesive layer ADu may be sequentially stacked on the upper surface of the first magnetic sheet part R1, and subsequently, another magnetic sheet part, e.g. the third magnetic sheet part R3, may be stacked thereon, thereby forming the magnetic sheet 210B shown in FIG. 5. In this case, the bonding part A3 disposed under the second magnetic sheet part R2 may be disposed after the third magnetic sheet part R3 is stacked, or may be disposed before the process shown in FIG. 6a is performed.

The process of manufacturing the magnetic sheet in a sequential stacking manner has been described with reference to FIGS. 6a to 6d. Hereinafter, a process of manufacturing a bonding part using a magnetic field will be described with reference to FIGS. 7a to 7c.

First, referring to FIG. 7a, an adhesive layer ADm'+ADb', in which magnetic particles are dispersed uniformly or non-uniformly in the thickness direction, is prepared. At this time, the thickness may correspond to the sum of the thickness of the lower adhesive layer and the thickness of the intermediate adhesive layer, e.g. T4+T5, shown in FIG. 4b. When a magnetic field, which acts on the magnetic particles as attractive force, is applied to the upper surface of the adhesive layer ADm'+ADb', as shown in FIG. 7b, the magnetic particles are concentrated toward the upper surface of the adhesive layer within the adhesive layer by the magnetic field. As a result, the adhesive layer ADm+ADb shown in FIG. 7b may be considered to have the same configuration as that in which the lower adhesive layer ADb and the intermediate adhesive layer ADm, which have the same adhesive component as each other, are stacked.

Thereafter, the upper adhesive layer ADu is applied on the adhesive layer ADm+ADb shown in FIG. 7b, thereby manufacturing the bonding part shown in FIG. 7c. At this time, the component of the adhesive layer ADm+ADb shown in FIG. 7b and the component of the upper adhesive layer ADu may be the same as or different from each other.

Of course, although not illustrated, in the case in which a substrate (e.g. a polymer film including a component such as PET) is included in the intermediate adhesive layer ADm, the intermediate adhesive layer ADm may maintain the shape thereof by itself, and thus the upper adhesive layer ADu and the lower adhesive layer ADb may be separately and directly applied to the intermediate adhesive layer ADm without being sequentially stacked on the magnetic sheet part.

Figure 8A:
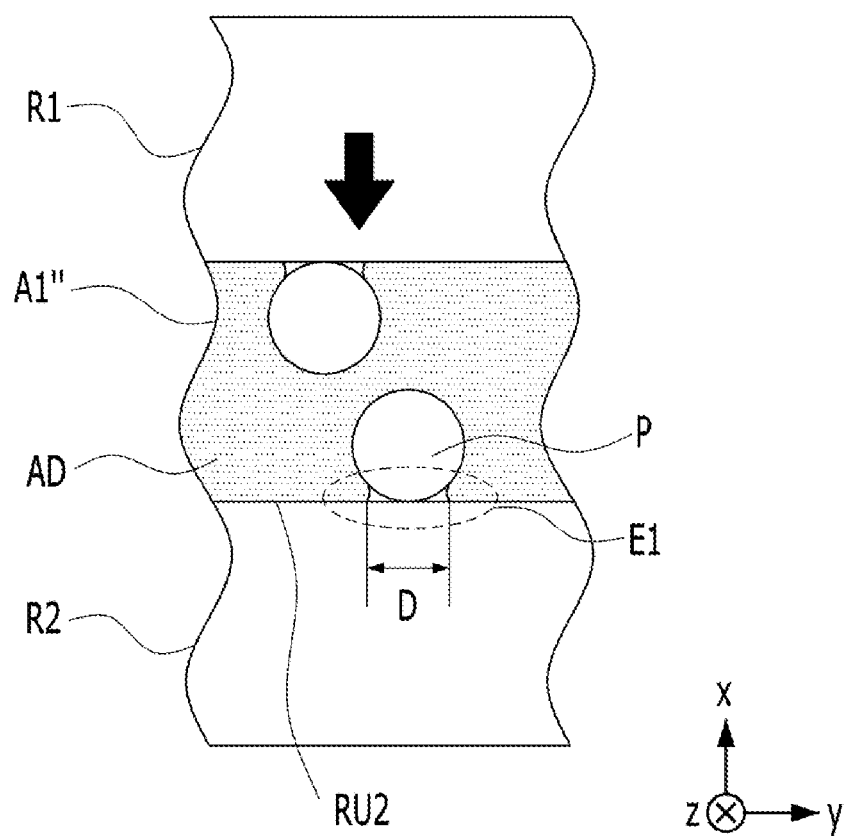
FIG. 8a is a cross-sectional view of a comparative example for explaining the effect of upper/lower adhesive layers according to an embodiment.
Figure 8B:
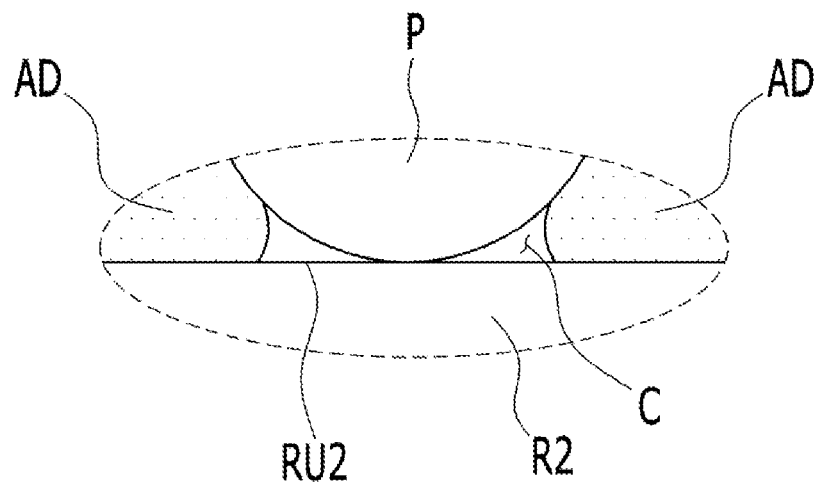
FIG. 8b is an enlarged cross-sectional view of portion 'E1' in FIG. 8a, and FIG. 8c is a cross-sectional view of another comparative example.

Next, the effect obtained by the magnetic particles having a concentration gradient in the thickness direction of the bonding part will be described below with reference to FIGS. 8a to 8c. FIG. 8a is a cross-sectional view of a comparative example for explaining the effect of the upper/lower adhesive layers according to the embodiment, FIG. 8b is an enlarged cross-sectional view of portion 'E1' in FIG. 8a, and FIG. 8c is a cross-sectional view of another comparative example.

Unlike the bonding part A1 according to the embodiment, a bonding part A1' according to the comparative example shown in FIG. 8a includes only an intermediate adhesive layer ADm, without an upper adhesive layer ADu or a lower adhesive layer ADb. In the case in which the bonding part A1' according to this comparative example is employed, magnetic particles, which are inorganic materials having poor affinity, come into contact with an adhesive AD, which is an organic material. Thus, the adhesive AD may be relatively easily separated from the magnetic particles P, and may not be present in a region E1 between the upper surface RU2 of the second magnetic sheet part R2 and the bottom of each magnetic particle P. In some cases, the magnetic particles may be in direct contact with the upper surface RU2 of the second magnetic sheet part R2. Therefore, since the adhesive AD is not present in a circular planar region corresponding to the diameter denoted by 'D', bonding area loss occurs in the corresponding area.

A more detailed description of the portion E1 will be made with reference to FIG. 8b. Referring to FIG. 8b, since the affinity of the adhesive AD with the magnetic particle P is low, the adhesive AD may not completely surround the lower surface of the magnetic particle that is located at the edge. Thus, a cavity C, in which the adhesive is not charged, is formed between the upper surface RU2 of the second magnetic sheet part R2 and the magnetic particle P, and accordingly a bonding surface, which corresponds to the lower planar surface of the cavity C, is lost. Therefore, the bonding state is not maintained in the stacked structure, and the bonding force is lowered. This problem is more likely to occur when the content of magnetic particles in the bonding part is higher or when the sizes of the magnetic particles are less uniform. As a result, the comparative example has a problem in which the ratio of the weight of the magnetic particles to the total weight of the bonding part must not exceed 50% in order to secure the bonding force of the bonding part.

Figure 8C:
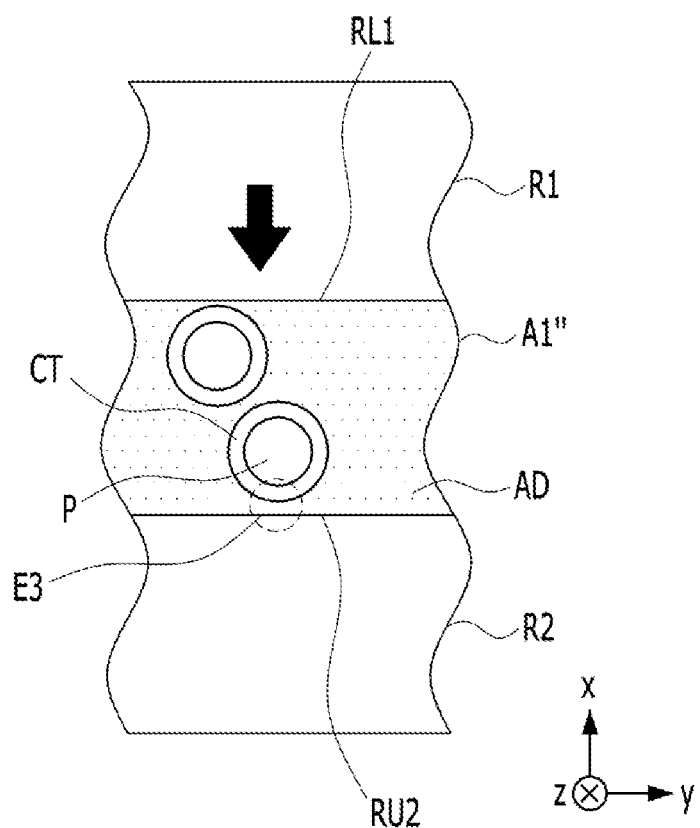

Of course, as shown in FIG. 8c, in the case in which a coating layer CT is formed on the surface of the magnetic particle P using an organic material, even when the magnetic particle P is pushed toward the edge, an adhesive AD may be present in a region E3 between the upper surface RU2 of the second magnetic sheet part R2 and the bottom of the magnetic particle P because both the coating layer CT and the adhesive AD include organic materials and thus the affinity therebetween is high. Thus, the magnetic particle P does not come into direct contact with the top surface RU2 of the second magnetic sheet part R2, but the adhesive comes into contact with the top surface RU2 of the second magnetic sheet part R2, thereby securing the bonding area between the bonding part A1 and the upper surface RU2 of the second magnetic sheet part R2. However, this case still has a problem in which surface treatment is required in order to uniformly form the coating layer CT on each magnetic particle P. When the thickness of the coating layer CT is too large, the thickness of the bonding part may also increase, and the magnetic particles P may agglomerate together. When the thickness of the coating layer CT is too small, the role in coupling (i.e. enhancement of the affinity between the organic materials) may not be sufficiently achieved.

In contrast, according to the embodiment, even when the content of the magnetic particles is high (e.g. 90 wt % or less), the bonding force is secured through a structure in which thin-film-type adhesive layers are disposed on and under an adhesive layer in which magnetic particles are dispersed.

Next, the magnetic characteristics of the magnetic sheets according to the embodiment and the comparative example will be compared and described below with reference to FIGS. 9a and 9b.

Figure 9A:
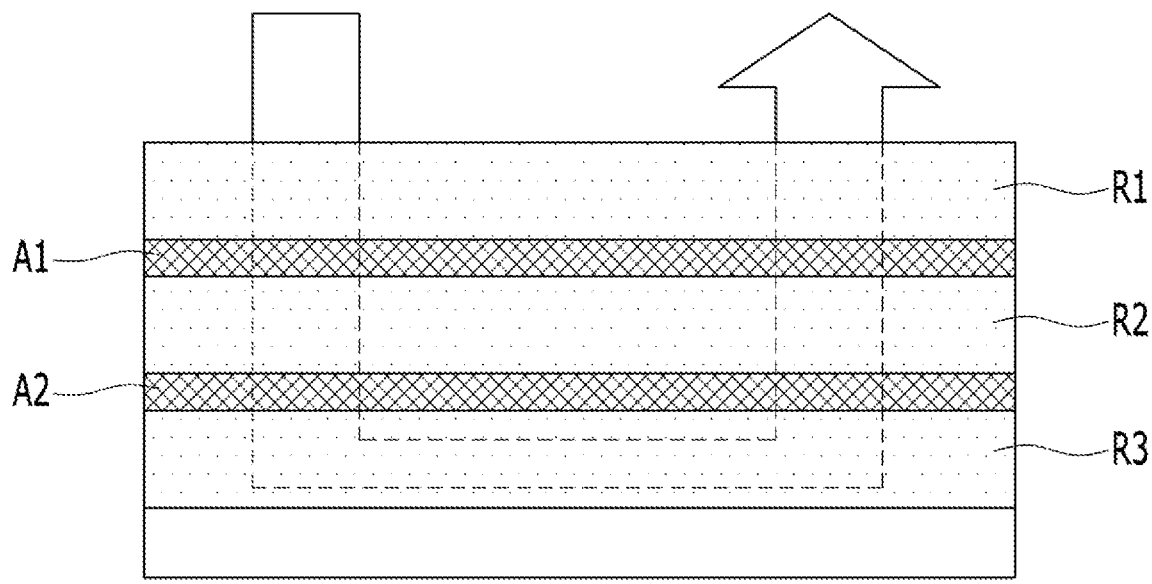
FIG. 9a is a cross-sectional view for explaining the magnetic characteristics of the magnetic sheet according to an embodiment.
Figure 9B:
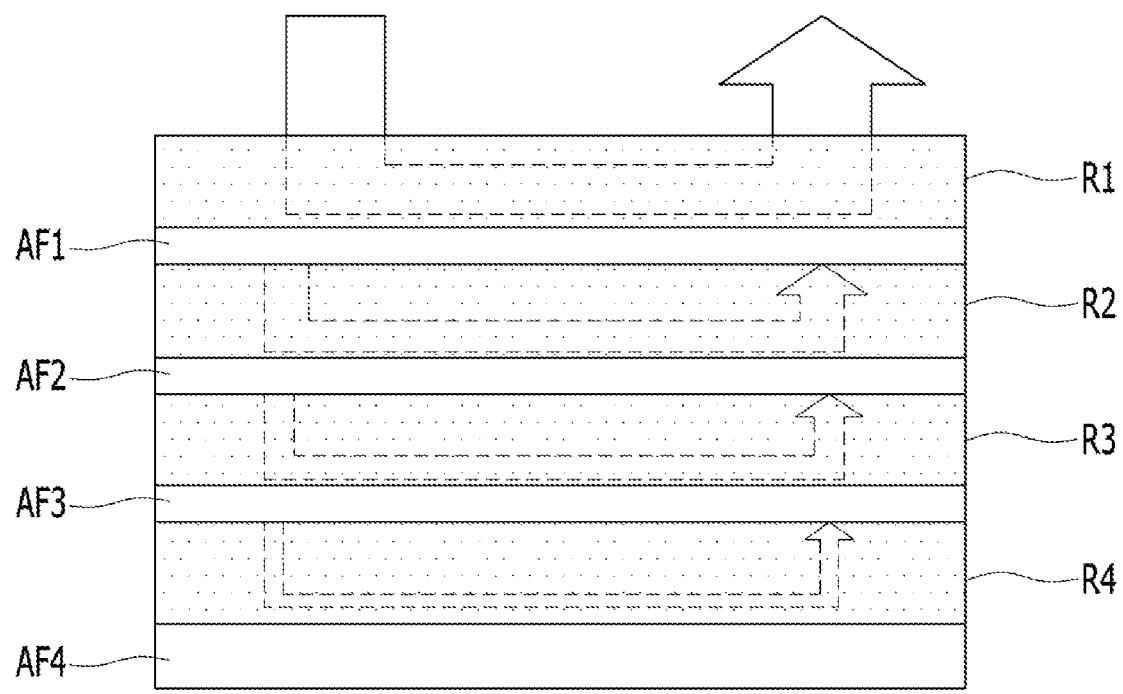
FIG. 9b is a cross-sectional view for explaining the magnetic characteristics of the magnetic sheet according to the comparative example.

FIG. 9a is a cross-sectional view for explaining the magnetic characteristics of the magnetic sheet according to the embodiment, and FIG. 9b is a cross-sectional view for explaining the magnetic characteristics of the magnetic sheet according to the comparative example.

Referring to FIG. 9a, the magnetic sheet according to the embodiment is configured such that magnetic particles are contained in a large amount (50 to 90 wt %) in each of the bonding parts A1 and A2, which are disposed between the magnetic sheet parts R1, R2 and R3. Thus, the effective magnetic permeability is high, and thus magnetic flux loss is low.

On the other hand, as shown in FIG. 9b, in the case in which adhesive films AF (AF1 to AF4), which do not contain magnetic particles, are disposed between magnetic sheet parts R1, R2, R3 and R4, large magnetic flux loss occurs due to the adhesive films, which are insulation members. Thus, in order to obtain the same effective magnetic permeability as that shown in FIG. 9a, a larger number of magnetic sheet parts needs to be stacked. Actually, the present applicant measured an increase in transfer efficiency of 1% or more when one of the adhesives films in the comparative example shown in FIG. 9b was substituted with a bonding part (90 wt %) according to the embodiment.

Furthermore, the adhesive film has a structure in which adhesives are disposed on and under a substrate (i.e. a polymer film). Thus, as the number of stacked magnetic sheet parts increases, and the number of adhesive films disposed between the magnetic sheet parts also increases, thereby increasing the thickness of the magnetic sheet according to the comparative example and making it difficult to reduce the thickness thereof.

Meanwhile, according to one embodiment, it is proposed to use a metallic ribbon as the magnetic sheet part constituting the magnetic sheet 210 and to form cracks in the metallic ribbon in order to reduce eddy current loss.

FIG. 10 is a graph comparing actual magnetic permeability for each frequency before and after cracks are formed in the metallic ribbon. Here, the difference between magnetic permeability and magnetic permeability loss may refer to actual magnetic permeability.

Referring to FIG. 10, it can be seen that the actual magnetic permeability after forming cracks in the metallic ribbon is much larger than the actual magnetic permeability before forming cracks in the metallic ribbon at a frequency band at which wireless power transfer is performed, e.g. about 150 kHz.

In the case in which the metallic ribbon is used as the magnetic sheet part of the magnetic sheet 210, it is possible to reduce eddy current loss and to improve transfer efficiency by forming cracks in the metallic ribbon.

Preferably, when forming cracks in the metallic ribbon in a uniform pattern, the transfer efficiency of the magnetic sheet may be improved, and more uniform performance may be obtained.

Figure 11:
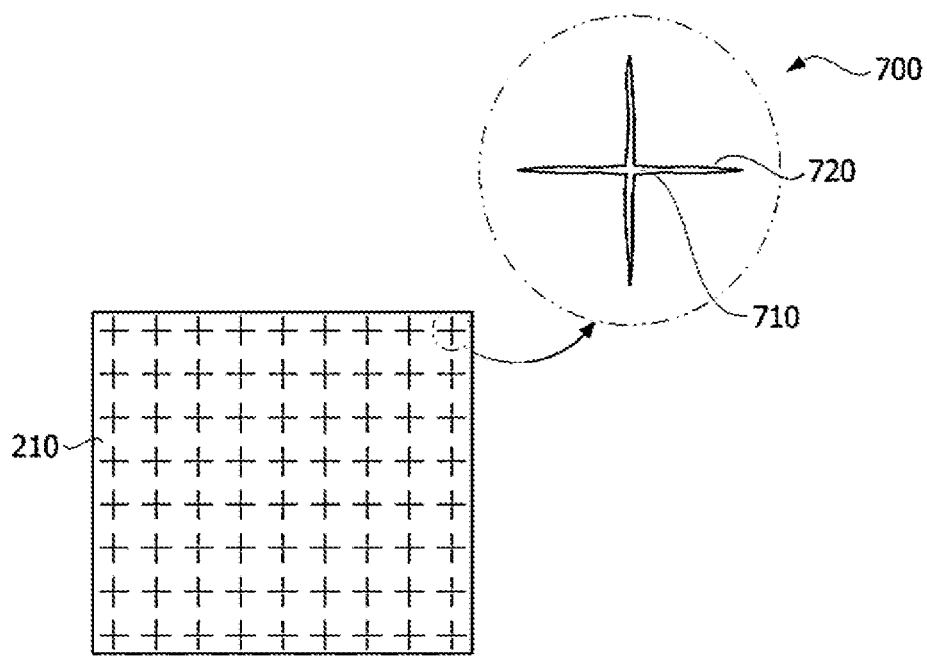
FIGS. 11 to 13 illustrate top views of magnetic sheet parts according to embodiments.
Figure 12:
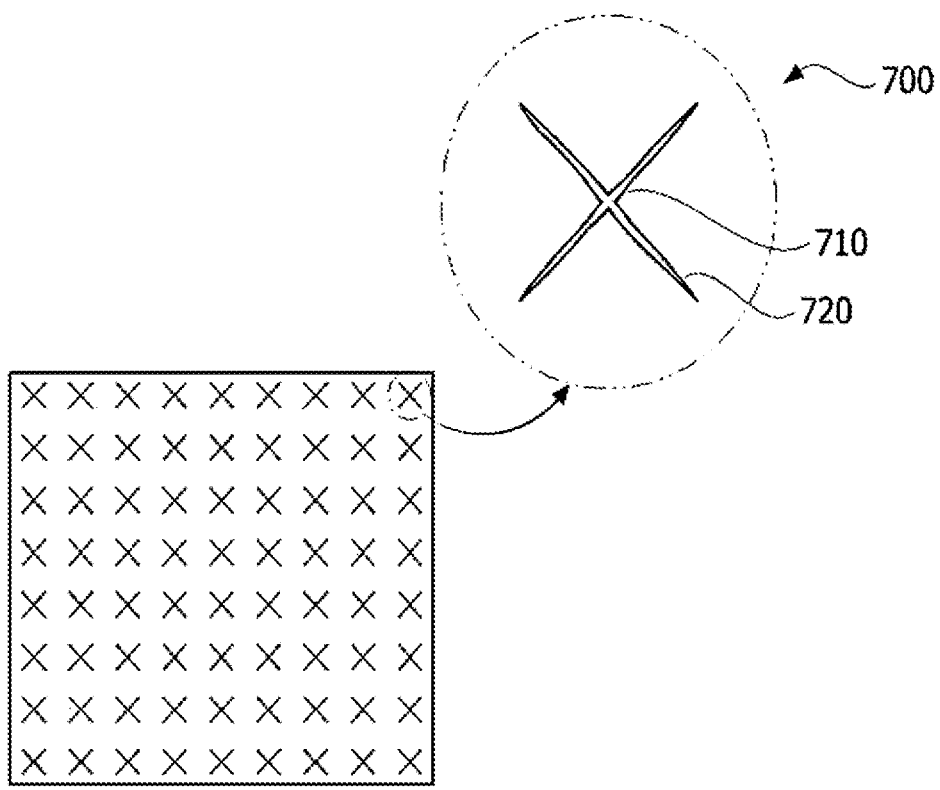
Figure 13:
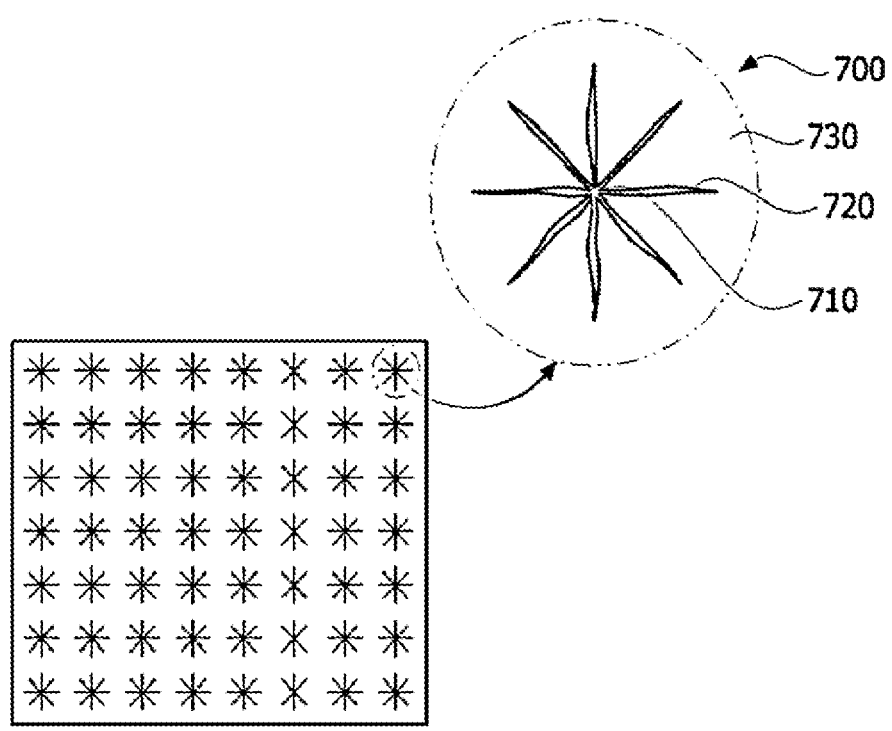

FIGS. 11 to 13 are top views of magnetic sheet parts according to embodiments.

Referring to FIGS. 11 to 13, a pattern 700, which includes three or more lines 720 extending radially from a predetermined point 710, is formed in the magnetic sheet part constituting the magnetic sheet 210. Here, the pattern may be formed as a crack. At this time, a plurality of patterns 700 may be repeatedly formed in the magnetic sheet part, and each pattern 700 may be disposed so as to be surrounded by a plurality of patterns, e.g. three to eight patterns 700.

As such, in the case in which patterns are repeatedly formed in the magnetic sheet part of the magnetic sheet 210, eddy current loss may be reduced, and uniform and predictable transfer efficiency may be obtained.

At this time, the average diameter of each pattern 700 may range from 50 μm to 600 μm. When the diameter of the pattern 700 is less than 50 μm, metal particles may be excessively generated on the surface of the metallic ribbon during the formation of the cracks. When metal particles are present on the surface of the magnetic sheet 210, there is a risk of short circuit due to entry of the metal particles into the circuit. On the other hand, when the diameter of the pattern 700 exceeds 600 μm, the distance between the patterns 700 is large, and thus the effect obtained by forming cracks, i.e. the effect of increasing the actual magnetic permeability, may be deteriorated.

Figure 14:
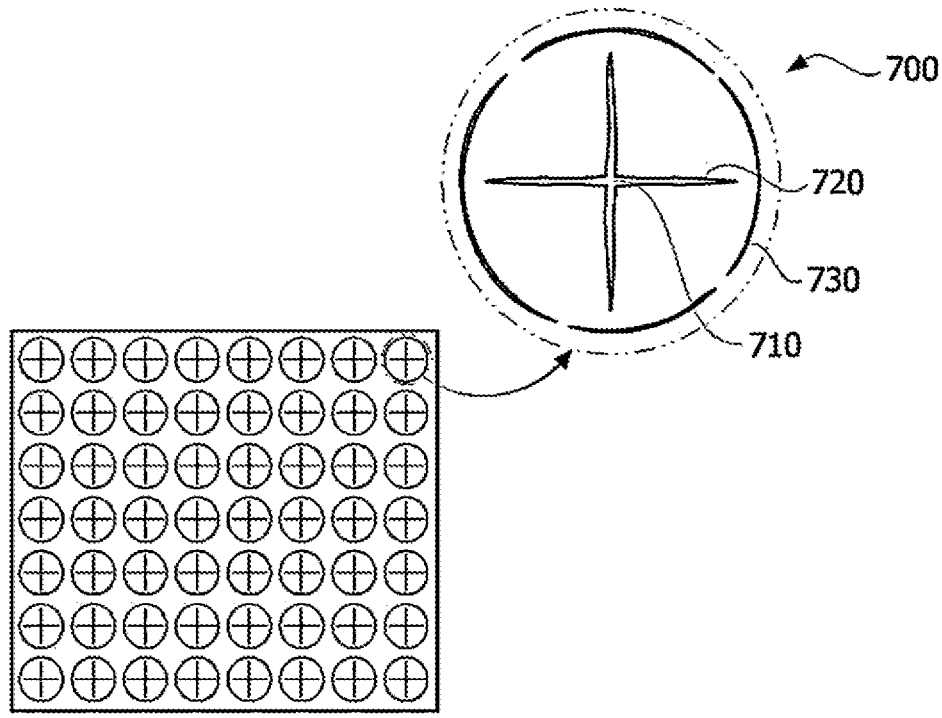
FIGS. 14 and 15 are top views of magnetic sheet parts according to other embodiments.
Figure 15:
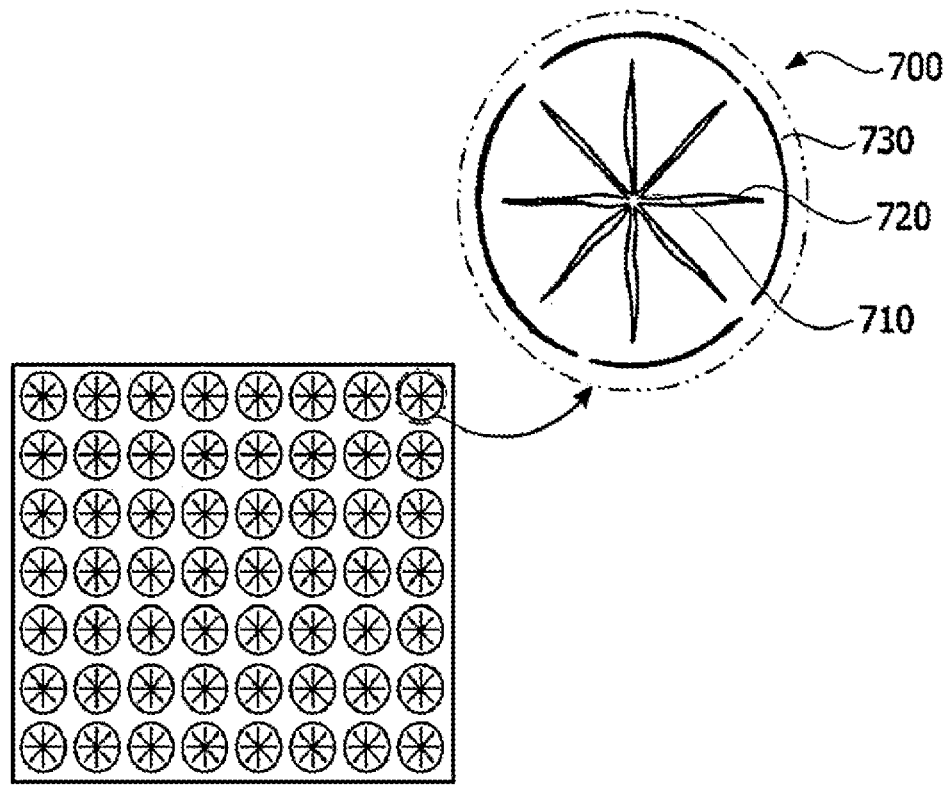

FIGS. 14 and 15 are top views of magnetic sheet parts according to other embodiments.

Referring to FIGS. 14 and 15, a pattern 700, which includes three or more lines 720 extending radially from a predetermined point 710 and a rim 730 surrounding the same, is formed in the magnetic sheet part of the magnetic sheet 210. Here, the pattern may be formed as a crack. Here, the rim 730 may not be a crack that is completely cut out, but may be a crack that is partially cut out. At this time, a plurality of patterns 700 may be repeatedly formed in the magnetic sheet part, and each pattern 700 may be disposed so as to be surrounded by a plurality of patterns, e.g. three to eight patterns 700.

As such, in the case in which patterns are repeatedly formed in the magnetic sheet part, eddy current loss may be reduced, and uniform and predictable transfer efficiency may be obtained.

At this time, the average diameter of each pattern 700 may range from 50 μm to 600 μm. Since the characteristics depending on the ranges are similar to those described above, a duplicate explanation thereof is omitted.

When the pattern 700 includes the rim 730, the effect obtained by forming cracks is further enhanced, the boundaries between the patterns 700 are clearly distinguished, and the repeated patterns become clearer, thereby further enhancing the uniformity of quality.

Furthermore, the pattern 700 may include six or more lines 720 extending radially from a predetermined point 710 and a rim 730 surrounding the same. When six or more lines 720 are formed within the rim 730, the effect obtained by forming cracks may be maximized.

Figure 16:
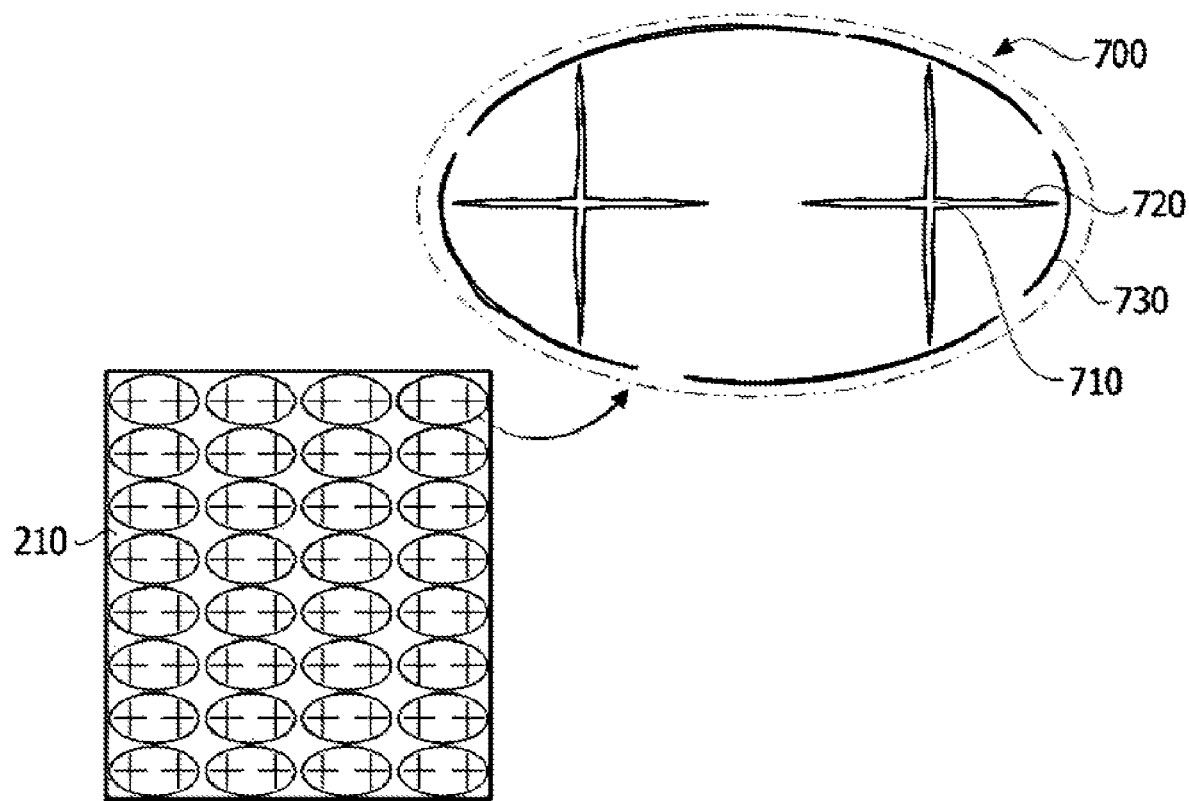
FIG. 16 illustrates a top view of a magnetic sheet part according to still another embodiment.

FIG. 16 is a top view of a magnetic sheet part according to still another embodiment.

Referring to FIG. 16, a pattern 700, which includes three or more lines 720 extending radially from a predetermined point 710 and a rim 730 surrounding two or more sets each including the three or more lines extending from the point, is formed in the magnetic sheet part of the magnetic sheet 210. Here, the pattern may be formed as a crack. At this time, a plurality of patterns 700 may be repeatedly formed in the magnetic sheet part, and each pattern 700 may be disposed so as to be surrounded by a plurality of patterns, e.g. three to eight patterns 700.

Meanwhile, the cracking process may include a process of realizing surface patterning by applying pressure to the magnetic sheet part or a process of breaking the internal structure of the surface by applying constant cracking force thereto. Through this, the cracked structure is included in the surface of the magnetic sheet part or inside of the same, thereby reducing magnetic permeability and further increasing transfer efficiency. In one example, in order to form cracks in the metallic ribbon in a uniform pattern, a roller, which is made of a urethane material and includes protrusions formed in a predetermined pattern, may be used to press the metallic ribbon. The roller made of a urethane material may enable the formation of cracks in a uniform pattern and may minimize metal particles remaining on the surface of the metallic ribbon compared to a roller made of a metal material. At this time, the pressing process may be performed at 25 to 200° C. and 10 to 3000 Pa for 10 minutes or less.

As described above, the metallic ribbon in which cracks are repeatedly formed in a predetermined pattern is used for at least a portion of the magnetic sheet part constituting the magnetic sheet of the wireless power receiving device, with the result that magnetic permeability and saturation magnetic field may be increased, and eddy current loss may be reduced. In addition, it is possible to increase transfer efficiency and to obtain uniform and predictable performance by forming cracks in the metallic ribbon in a uniform pattern. Of course, depending on the embodiment, a metallic ribbon in which cracks are formed in random shapes may be used for the magnetic sheet part.

Meanwhile, in the magnetic sheet 210 according to one embodiment, which has a structure in which a plurality of magnetic sheet parts is stacked, some magnetic sheet parts may have a structure (hereinafter referred to as a "non-cracked structure") that has not undergone a cracking process or a breaking process, and the remaining magnetic sheet parts may have a cracked structure.

For example, a magnetic sheet part having a structure (hereinafter referred to as a "non-cracked structure") that has not undergone a cracking process or a breaking process may be disposed on the surface of the uppermost magnetic sheet part or the lowermost magnetic sheet part or on the surfaces of both the uppermost magnetic sheet part and the lowermost magnetic sheet part.

The stacked structure of the outermost magnetic sheet part having such a non-cracked structure may solve a problem in which permeation of salt water occurs in a subsequent process due to the cracked structure of the remaining magnetic sheet parts, and may also solve a problem in which the cracked structure is exposed to the outer surface of the magnetic sheet and thus is damaged by a protection film or the like in a subsequent connecting process.

In particular, the magnetic sheet part having a cracked structure according to the embodiment has lower magnetic permeability than the magnetic sheet part having a non-cracked structure, and the porosity inside the magnetic sheet part having a cracked structure is higher than the porosity inside the magnetic sheet part having a non-cracked structure.

Although the embodiments have been described with reference to the configuration in which the bonding part is implemented as an adhesive in which a plurality of magnetic particles is dispersed, the disclosure is not limited thereto. The bonding part may be implemented as an adhesive film that is coated on at least one side thereof with an adhesive in which magnetic particles are dispersed.

While the present disclosure has been particularly shown and described with reference to exemplary embodiments thereof, these embodiments are only proposed for illustrative purposes and do not restrict the present disclosure, and it will be apparent to those skilled in the art that various changes in form and details may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

The invention claimed is:

1. A magnetic sheet, comprising:
a first magnetic sheet part comprising a first surface;
a second magnetic sheet part comprising a second surface that faces the first surface; and
a bonding part disposed between the first surface and the second surface,
wherein the bonding part comprises a plurality of magnetic particles,
wherein the magnetic particles have a concentration gradient in a thickness direction of the bonding part, and
wherein a concentration of the magnetic particles gradually increases toward a center in the thickness direction of the bonding part.

2. The magnetic sheet according to claim 1, wherein the concentration of the magnetic particles is asymmetrical with respect to the center in the thickness direction of the bonding part.

3. The magnetic sheet according to claim 1, wherein the magnetic particles are contained in an amount of 50 to 90% by weight in the bonding part.

4. The magnetic sheet according to claim 1, wherein the bonding part comprises:
a first layer;
a second layer disposed under the first layer; and
a third layer disposed under the second layer, and
wherein the magnetic particles are contained in the second layer.

5. The magnetic sheet according to claim 4, wherein the first layer and the third layer comprise a first adhesive,
wherein the second layer comprises a second adhesive, and
wherein the magnetic particles are dispersed in the second adhesive.

6. The magnetic sheet according to claim 5, wherein the first adhesive and the second adhesive comprise different components from each other.

7. The magnetic sheet according to claim 6, wherein the first adhesive comprises at least one of ethyl vinyl acetate, polyamide, polyolefin, or reactive urethane, and
wherein the second adhesive comprises at least one of an acrylic resin, a urethane resin, an epoxy resin, a silicon resin, a phenol resin, an amino resin, an unsaturated polyester resin, a polyurethane resin, a urea resin, a melamine resin, a polyimide resin, a diallyl phthalate resin, or a modified resin thereof.

8. The magnetic sheet according to claim 4, wherein the second layer has a larger thickness than the first layer and the third layer.

9. The magnetic sheet according to claim 1, wherein at least one of the first magnetic sheet part or the second magnetic sheet part comprises a plurality of patterns, each of the patterns comprising three or more lines extending radially from a predetermined point.

10. A wireless power receiving device configured to receive power transferred from a wireless power transmitting device, the wireless power receiving device comprising:
a substrate;
a magnetic sheet disposed on the substrate; and
a coil disposed on the magnetic sheet, the coil being configured to receive electromagnetic energy emitted from the wireless power transmitting device,
wherein the magnetic sheet comprises:
a first magnetic sheet part comprising a first surface;
a second magnetic sheet part comprising a second surface that faces the first surface; and
a bonding part disposed between the first surface and the second surface,
wherein the bonding part comprises a plurality of magnetic particles,
wherein the magnetic particles have a concentration gradient in a thickness direction of the bonding part, and
wherein a concentration of the magnetic particles gradually increases toward a center in the thickness direction of the bonding part.

11. The wireless power receiving device according to claim 10, wherein the magnetic particles are contained in an amount of 50 to 90% by weight in the bonding part.

12. The wireless power receiving device according to claim 10, wherein the wireless power receiving device is included in a mobile terminal.

13. The wireless power receiving device according to claim 10, wherein the concentration of the magnetic particles is asymmetrical with respect to the center in the thickness direction of the bonding part.

14. The wireless power receiving device according to claim 10, wherein the bonding part comprises:
a first layer;
a second layer disposed under the first layer; and
a third layer disposed under the second layer, and
wherein the magnetic particles are contained in the second layer.

15. The wireless power receiving device according to claim 14, wherein the first layer and the third layer comprise a first adhesive,
wherein the second layer comprises a second adhesive, and
wherein the magnetic particles are dispersed in the second adhesive.

16. The wireless power receiving device according to claim 15, wherein the first adhesive and the second adhesive comprise different components from each other.

17. The wireless power receiving device according to claim 16, wherein the first adhesive comprises at least one of ethyl vinyl acetate, polyamide, polyolefin, or reactive urethane, and
wherein the second adhesive comprises at least one of an acrylic resin, a urethane resin, an epoxy resin, a silicon resin, a phenol resin, an amino resin, an unsaturated polyester resin, a polyurethane resin, a urea resin, a melamine resin, a polyimide resin, a diallyl phthalate resin, or a modified resin thereof.

18. The wireless power receiving device according to claim 14, wherein the second layer has a larger thickness than the first layer and the third layer.

19. The wireless power receiving device according to claim 10, wherein at least one of the first magnetic sheet part or the second magnetic sheet part comprises a plurality of patterns, each of the patterns comprising three or more lines extending radially from a predetermined point.

20. A wireless power receiving device, comprising:
at least three magnetic sheet parts stacked on one another; and
bonding parts, one of the bonding parts being disposed between two opposing surfaces of every two adjacent ones of the stacked magnetic sheet parts,
wherein the bonding parts comprise a plurality of magnetic particles,
wherein the magnetic particles have a concentration gradient in a thickness direction of the bonding parts, and wherein a concentration of the magnetic particles gradually increases toward a center in the thickness direction of the bonding parts.

* * * * *